Jan. 24, 1956  J. H. WARD ET AL  2,731,755
GUIDE OR LURE FOR DEEP FISHING
Filed March 27, 1953
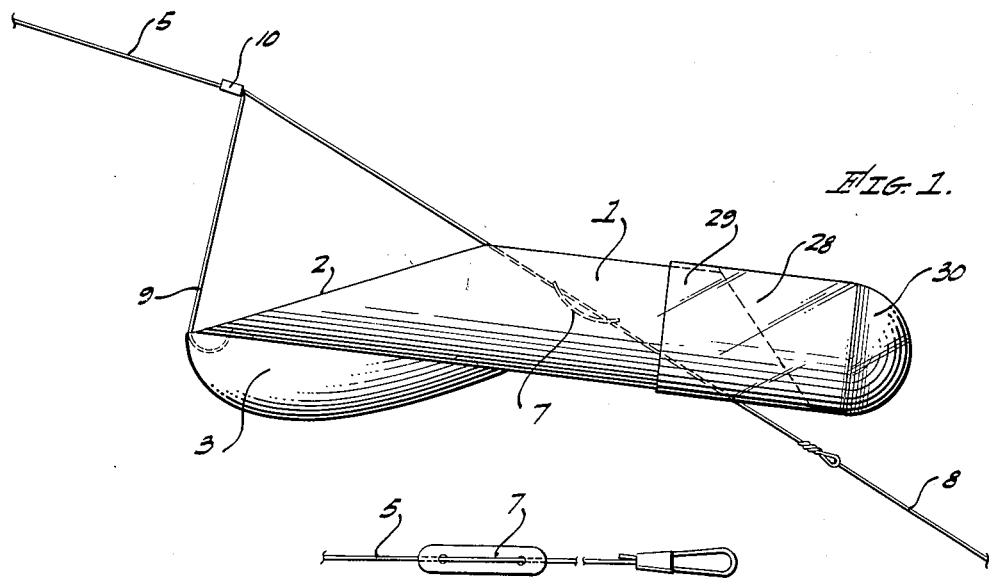
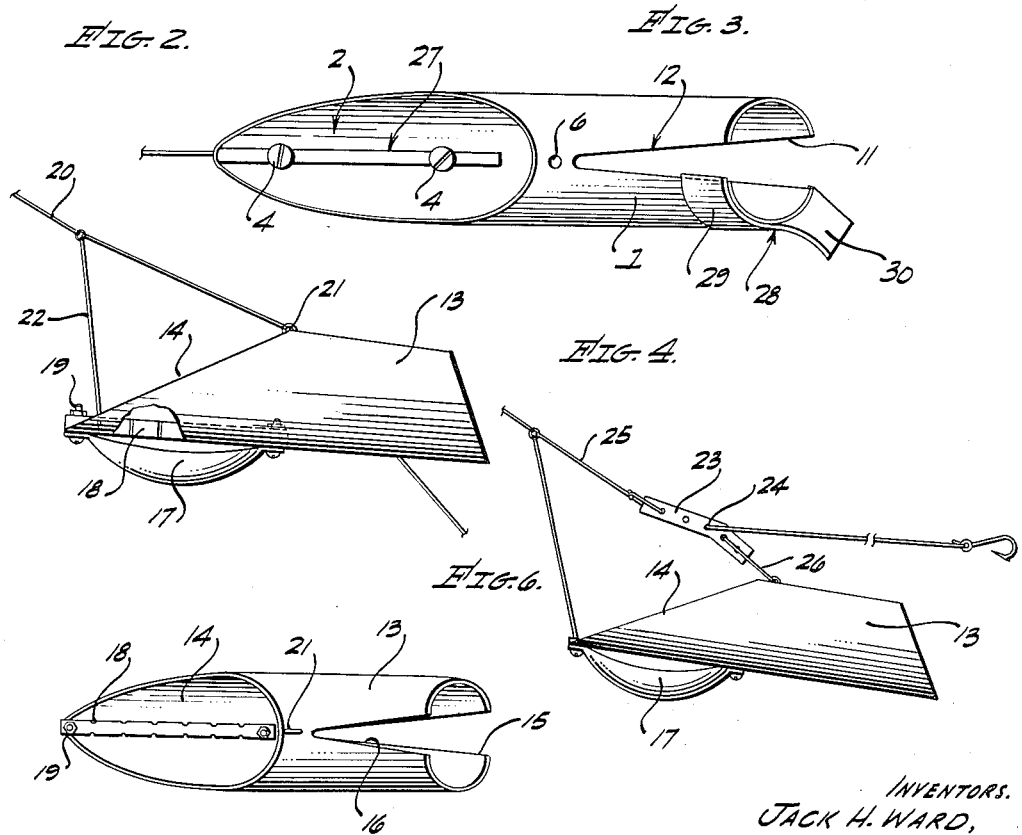
INVENTORS.
JACK H. WARD,
ROY A. ROSS,
BY
ATTORNEY.

United States Patent Office 2,731,755
Patented Jan. 24, 1956

2,731,755
GUIDE OR LURE FOR DEEP FISHING

Jack H. Ward, Long Beach, and Roy A. Ross, Santa Ana, Calif.; said Jack H. Ward assignor to said Roy A. Ross Application March 27, 1953, Serial No. 345,062

4 Claims. (Cl. 43—13)

This invention relates to a guide or lure whereby a fishhook is deflected downwardly in the water, and to enable a fisherman to maintain a fishhook at a considerable depth in the water below the surface without using heavy weights or cumbersome equipment.

An object of our invention is to provide a novel guide or lure for deep fishing which will effectively move downwardly into the water when it is towed from a boat as when troll fishing.

Another object of our invention is to provide a novel guide or lure of the character stated, which will tend to remain steady at a particular depth in the water while being towed, and will not dart to either side or upwardly or downwardly to any appreciable extent, but will maintain a steady movement in a substantially horizontal plane.

Another object of our invention is to provide a means whereby the guide or lure can be so adjusted as to move to greater or lesser depths in the water.

A feature of our invention is to provide a novel guide or lure which is simple in construction, inexpensive to manufacture, and effective in operation.

Other objects, advantages and features of invention may appear from the accompanying drawing, the subjoined detailed description and the appended claims.

In the drawing:

Figure 1 is a side elevation of our guide or lure.

Figure 2 is a top plan view of the same with portions of the line attachment omitted.

Figure 3 is a plan view of a portion of the fishing line with the adjustable stop thereon.

Figure 4 is a side elevation of a modified form of guide or lure.

Figure 5 is a top plan view of the construction shown in Figure 4 with portions of the line attachment omitted.

Figure 6 is a side elevation of still another form of guide or lure.

Referring more particularly to the drawing, the preferred form of our invention is shown in Figures 1, 2 and 3, and consists essentially of a metallic tube 1 formed of a light material, such as a suitable metal or plastic. The forward end of the tube 1 is cut at an angle, as shown at 2. The purpose of this cut is to increase the area exposed to the force of the water, and due to the angularity of the cut 2 there is a tendency to press the forward end of the guide downwardly. A weight 3, preferably lead, is secured to the bottom of the tube 1 by means of suitable screws 4, or the like.

The fishing line 5 extends through a hole 6 in the top of the tube 1, this hole being close to and back of the upper edge of the inclined cut 2. The line 5 extends through an adjustable stop or plate 7 which engages the bottom of the tube 1 so as to prevent the forward movement of the line 5 through the hole 6. A leader or hook 8 is attached to the rear end of the fishing line 5. A second short length of fishing line 9 is attached to the line 5 by the clip 10. The other end of the line 9 is placed between the weight 3 and the bottom of the tube 1, and when the screws 4 are tightened the line 9 will thus be fixedly held and attached to the front end of the tube 1.

By sliding the stop 7 lengthwise along the line 5, it is possible to vary the angle between the line and the longitudinal axis of the tube 1. Thus it is possible to adjust the depth at which the guide or lure will operate. To prevent the guide or lure from darting in different directions, it is necessary to permit the water to escape from the rear portion of the tube 1 as rapidly as possible. To accomplish this we provide a V-shaped slot 11 in the bottom of the tube and a second slot 12 in the top of the tube. These slots taper towards the forward end of the tube 1 and the water can pass through these slots and will not be trapped or retained within the rear tubular portion of the tube 1, and since the water can pass freely through the tube, the tendency to dart or to deviate from a straight path is eliminated. The weight 3 also acts as a guide or rudder and tends to hold the tube 1 from moving to either side or to dart upwardly or downwardly.

In the modification shown in Figures 4 and 5 the tubular body 13 is the same construction as the tubular body 1, previously described. The front end is cut at an angle, as shown at 14, which is the same as the angular cut 2 previously described. Also the rear part of the tubular body 13 has the notches 15 and 16 cut therein, which are similarly arranged as the notches 11 and 12, previously described. The purpose of these notches is again the relief of the water as it passes through the tubular body 13 and to prevent the guide or lure from darting or diving as a result of water acceleration at the rear of the guide or lure. A weight 17 is attached to the bottom and forward end of the tubular body 13, and a bar 18 is mounted on the inside of the tubular body 13 and at the forward end thereof. A pair of bolts 19 extend through the bar 18 through the bottom of the body 13 and through the weight 17, thus holding the weight in position. By loosening the bolts 19 it is possible to raise the bar 18 to permit adjustment of the towing sling of the fishing line as follows: The line 20 is attached to the top of the tubular body 13 and immediately to the rear of the inclined surface or cut 14, as shown at 21. A second line 22 is attached at one end to the line 20 and the other end is held under the bar 18 in any desired adjusted position throughout the length of this bar. Thus it is possible to adjust the angle of incidence of the front of the guide or lure so that the body 13 is thus caused to move to a greater or lesser depth in the water.

In Figure 6 we have shown still another means of adjusting the angle of incidence of the body 13, which consists of an angular metal bar 23 formed with a number of spaced holes 24. The fishing line 25 is attached to the front of the plate 23 and the rear end of the plate is attached to the body 13 through a line 26. The line 26 can be adjusted in any of the various holes 24, thus varying the angularity of the front end of the body 13 for the purpose of adjusting the depth at which it will move.

If desired, the weight 3 can be slidably mounted on the tubular body 1, that is, the screws 4 may extend through a slot 27 in the bottom of said tube. Thus by loosening the screws 4 it is possible to slide the weight 3 forwardly or rearwardly on the body 1, thus changing the angle of pull of the fishing line 5 by moving the line 9 with the weight 3. The lower end of the line 9 is embedded in the weight 3 and thus can be moved forwardly or rearwardly relative to the body 1, thereby adjusting the depth at which the guide or lure will operate.

For the purpose of guiding the lure away from the boat which is towing the same, we may provide a fin 28 which is provided with a sleeve 29 partly encircling one of the bifurcations at the rear of the lure. An angular fin 30 projects from the sleeve portion 29 of the guide, thus acting as a rudder to deflect the device away from the boat if it is desired to fish some distance from the side of the boat.

The lure is pulled by the fishing line attached to the clip 10 and is puled through the water at substantial speeds, such as three to six miles per hour, or more. The forward motion of the lure will cause water to be scooped up through the angular opening 2, and this entering water will tend to move upwardly inside of the tube 1. While the lure is moving through the water there is also a vertical movement of water through the tube 1 and moving from the top V-slot 12 to the bottom V-slot 11. When the water entering at the front of the tube 1 strikes the flow of water from the slot 12 to the slot 11, it causes the water within the tube 1 to turn downwardly and pass out through the V-slot 11, causing the water to swirl. This swirling action pushes the rear end of the tube upwardly, causing the lure to be urged downwardly in the water. However, the fishing line 5 pulls upwardly at all times and, consequently, a balance occurs which causes the lure to maintain a substantially level course in the water. The sides of the tube 1 adjacent the V-slots 11 and 12 act as rudder fins and keep the lure in a straight path.

Having described our invention, we claim:

1. A guide or fishing lure comprising a tubular body having open forward and rear ends, a weight attached to said body at the forward end thereof, said body having slots formed therein at the rear end in diametrically opposite portions defining the respective top and bottom of the body, said slots extending forwardly from the rear edge of said body for a distance less than half the length of the body, and the forward end of said body being cut at an angle to the longitudinal axis thereof to form an ellipse like opening, a fishing line secured at one end to the body, a second line secured at one end to the fishing line, and means adjustably securing the other end of said second line to the forward end of said body.

2. A guide or fishing lure comprising a tubular body having open forward and rear ends, a weight attached to said body at the forward end thereof, said body having slots formed therein at the rear end in diametrically opposite portion defining the respective top and bottom of the body, said slots extending forwardly from the rear edge of said body for a distance less than half the length of the body, a fishing line extending through said body, an adjustable stop on the fishing line engaging the body, and a second line, the second line being secured at one end to the fishing line and at the other end to said body.

3. A guide or fishing lure comprising a tubular body having open forward and rear ends, a weight attached to said body at the forward end thereof, said body having slots formed therein at the rear end in diametrically opposite portions defining the respective top and bottom of the body, said slots extending forwardly from the rear edge of said body for a distance less than half the length of the body, and the forward end of said body being cut at an angle to the longtiudinal axis thereof to form an ellipse like opening, a fishing line extending through said body, an adjustable stop on the fishing line engaging the body, and a second line, the second line being secured at one end to the fishing line and at the other end to said body.

4. A guide or fishing lure comprising a tubular body of uniform diameter from front to rear thereof, said tubular body having open forward and rear ends, a weight attached to the body at the forward end thereof, said weight being on the bottom of the body, said body having having slots formed therein at the rear end and on the top and bottom of the body, said slots extending forwardly from the rear end of said body for a distance less than half the length of the body, the forward end of said body being cut at an angle to the longitudinal axis thereof to form a substantially elliptical opening having a rear edge portion at the top of said body and a front edge portion at the bottom of said body, a fishing line secured at one end to the body and adjacent the rear edge portion of said opening, a second line secured at one end to the fishing line, and means adjustably securing the other end of said second line to the front edge portion of said body adjacent the front end of said opening.

References Cited in the file of this patent

UNITED STATES PATENTS

| | | |
|---|---|---|
| 786,597 | Picken | Apr. 4, 1905 |
| 1,645,874 | Sanford | Oct. 18, 1927 |
| 1,913,282 | Major | June 6, 1933 |
| 2,091,457 | Sauer | Aug. 31, 1937 |
| 2,234,943 | Nyman | Mar. 11, 1941 |
| 2,247,583 | Louthan | July 1, 1941 |